US009577317B2

(12) United States Patent
Kim et al.

(10) Patent No.: US 9,577,317 B2
(45) Date of Patent: Feb. 21, 2017

(54) HEAT RADIATION ANTENNA DEVICE, PORTABLE TERMINAL AND BATTERY COVER THEREWITH, AND METHOD FOR MANUFACTURING THE BATTERY COVER

(71) Applicant: Samsung Electronics Co., Ltd., Suwon-si, Gyeonggi-do (KR)

(72) Inventors: Jin-Man Kim, Gumi-si (KR); Hong-Ki Kim, Seoul (KR); Byung-Kyu Kim, Gumi-si (KR); Sang-Tae Lee, Gumi-si (KR); Jung-Sik Choi, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 406 days.

(21) Appl. No.: 14/155,924

(22) Filed: Jan. 15, 2014

(65) Prior Publication Data

US 2014/0240179 A1 Aug. 28, 2014

(30) Foreign Application Priority Data

Feb. 22, 2013 (KR) ........................ 10-2013-0019466

(51) Int. Cl.
*H04M 1/00* (2006.01)
*H01Q 1/24* (2006.01)
(Continued)

(52) U.S. Cl.
CPC ............. *H01Q 1/243* (2013.01); *H01P 11/001* (2013.01); *H01Q 1/02* (2013.01); *H01Q 1/526* (2013.01);
(Continued)

(58) Field of Classification Search
CPC ............ H01L 2924/00014; H01L 2224/32225; H01L 2224/32245; H04M 1/0214; H04M 1/0262; H04M 1/6041; H04N 2007/145
(Continued)

(56) References Cited

U.S. PATENT DOCUMENTS 8,905,317 B1 * 12/2014 Hsu .................... G06K 7/10356 235/487
2005/0111194 A1 5/2005 Sohn
(Continued)

FOREIGN PATENT DOCUMENTS

CN 102800923 A 11/2012
EP 1 533 840 A1 5/2005
(Continued)

OTHER PUBLICATIONS

Mohamadi, Fred; "Wafer-Scale Integration Brings Low Cost and a Small Footprint to Active Antenna Arrays"; Feb. 2005; XP-001229867.

*Primary Examiner* — Kwasi Karikari
(74) *Attorney, Agent, or Firm* — Jefferson IP Law, LLP

(57) ABSTRACT

A portable terminal employing a near field communication antenna with a heat radiation function is provided. The portable terminal includes a cover provided for the portable terminal, and an antenna device mounted on an inner surface of the cover. The antenna device includes a near field communication antenna coupled to a location on the inner surface of the cover, a shield sheet coupled to an upper surface of the antenna, a heat radiation sheet coupled to an upper surface of the shield sheet so as to discharge heat transmitted from the portable terminal, and a protection cover coupled to an upper surface of the heat radiation sheet.

29 Claims, 7 Drawing Sheets

(51) Int. Cl.
*H01Q 1/52* (2006.01)
*H01Q 7/00* (2006.01)
*H01P 11/00* (2006.01)
*H01Q 1/02* (2006.01)
*H01Q 1/38* (2006.01)

(52) U.S. Cl.
CPC .................. *H01Q 7/00* (2013.01); *H01Q 1/38* (2013.01); *Y10T 29/49018* (2015.01)

(58) Field of Classification Search
USPC ........................................................ 455/575.8
See application file for complete search history.

(56) References Cited

U.S. PATENT DOCUMENTS

| | | | | |
|---|---|---|---|---|
| 2006/0281500 | A1 | 12/2006 | Huang et al. | |
| 2009/0096413 | A1 | 4/2009 | Partovi et al. | |
| 2009/0310311 | A1* | 12/2009 | Kondoh | H04B 1/036 361/707 |

FOREIGN PATENT DOCUMENTS

| | | | |
|---|---|---|---|
| EP | 2 308 129 | B1 | 2/2012 |
| JP | 2005-191874 | A | 7/2005 |
| JP | 2006-278430 | A | 10/2006 |
| JP | 2007-200940 | A | 8/2007 |
| KR | 10-2009-0036465 | A | 4/2009 |
| KR | 10-2011-0099190 | A | 9/2011 |
| KR | 20-0460259 | Y1 | 5/2012 |
| KR | 10-1163574 | B1 | 7/2012 |
| WO | 2008/050917 | A1 | 5/2008 |

* cited by examiner

HEAT RADIATION ANTENNA DEVICE, PORTABLE TERMINAL AND BATTERY COVER THEREWITH, AND METHOD FOR MANUFACTURING THE BATTERY COVER

PRIORITY

This application claims the benefit under 35 U.S.C. §119 (a) of a Korean patent application filed on Feb. 22, 2013 in the Korean Intellectual Property Office and assigned Ser. No. 10-2013-0019466, the entire disclosure of which is hereby incorporated by reference.

BACKGROUND OF THE INVENTION

1. Field of the Invention

The present invention relates to a portable terminal. More particularly, the present invention relates to a portable terminal and a case having a near field communication antenna device with a heat radiation function, and a method for manufacturing the case.

2. Description of the Related Art

Generally, a portable terminal has a structure in which a cover is detachably coupled to a bottom surface of the portable terminal, such that the cover can be separated from the portable terminal in order to perform certain functions, such as recharging a battery pack. Since the cover of the portable terminal comes in direct contact with the hand of a user, the user directly feels heat generated from the portable terminal. Accordingly, if the portable terminal produces excessive heat, it is difficult for the user to hold the portable terminal.

On the other hand, portable terminals are now produced having a Near Field Communication antenna (NFC antenna) mounted thereon. With an NFC antenna, a bidirectional communication may be performed in a non-contact manner within a short range. The NFC antenna has a low data transmission rate in comparison with other technologies such as “Bluetooth”, “ZigBee” or the like, but has an advantage in that a communication setting time is short and failure of recognition occurs less frequently. Therefore, there is a trend in that NFC antennas are gradually employed in portable terminals and applied to various fields. For example, a portable terminal equipped with an NFC antenna may be used as a smart card such as, an electronic wallet, an electronic ticketing, a door key, an identity card, and the like. Also, business cards, telephone numbers, photographs, music files and the like can be shared and exchanged with acquaintances.

The NFC antenna is typically mounted on a certain portion of the portable terminal in order to provide smart functions for a user. More specifically, an NFC antenna is mainly mounted on a cover, especially a battery cover of the portable terminal in consideration of mounting compatibility. The battery cover is detachably coupled to a body of the portable terminal, on the inner surface of which the NFC antenna is mounted.

Hereinafter, a mounting structure of the NFC antenna mounted at a predetermined location on the case of the portable terminal will be described with reference to FIGS. 1 and 2. The conventional NFC antenna is mounted on the portable terminal in a manner as described below.

FIG. 1 is an exploded perspective view showing an NFC antenna device to be mounted on a portable terminal according to the related art. FIG. 2 is a sectional view showing the NFC antenna device of FIG. 1 according to the related art.

Referring to FIGS. 1 and 2, a shield sheet 32 is attached to an upper surface of an NFC antenna 31, and a protection sheet 33 is attached to an upper surface of the shield sheet 32. The attachment among the NFC antenna 31, the shield sheet 32, and the protection sheet 33 is established by using adhesive tapes 35*a*, 35*b* and 35*c*.

The NFC antenna 31 having such a structure is mounted and attached to a case of a portable terminal, for example a battery cover that is detachably coupled to a body of the portable terminal.

When the NFC antenna 31 is mounted on the portable terminal, however, the portable terminal becomes hot due to a temperature change of the human body, thereby making a user have a difficulty to hold the portable terminal.

Since the NFC antenna 31 is mounted on an inner surface of the case of the portable terminal, especially, users generally hold the bottom surface of the portable terminal with a hand while holding the portable terminal. If the portable terminal becomes hot to the extent of a temperature higher than a body temperature (e.g., 36.5° C.), there is a problem in carrying the portable terminal. Therefore, a heat radiation structure is necessary.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an antenna device and a portable terminal having the same, in which a Near Field Communication (NFC) antenna mounted on an inner surface of a case of the portable terminal is provided with a heat radiation unit, thereby lowering a sensory temperature felt by a user and preventing a performance depletion of the antenna.

Another aspect of the present invention is to provide an antenna device and a portable terminal having the same, in which a heat radiation unit has a plurality of sealing openings, thereby preventing a separation between layers when a battery cover is bent.

Still another aspect of the present invention is to provide an antenna device and a portable terminal having the same, in which an NFC antenna mounted on an inner surface of a battery cover of the portable terminal is provided with a heat radiation unit disposed between a shield unit and a protection cover, thereby lowering a sensory temperature felt by a user and preventing a performance depletion of the antenna.

In accordance with an aspect of the present invention, a portable terminal having a cover and an antenna device mounted on an inner surface of the cover is provided. The antenna device includes an NFC antenna coupled to a location to the inner surface of the cover, a shield sheet coupled to an upper surface of the antenna, a heat radiation sheet coupled to an upper surface of the shield sheet for discharging heat transferred from the portable terminal, and a protection cover coupled to an upper surface of the heat radiation sheet.

In accordance with another aspect of the present invention, an antenna device mounted on a portable terminal is provided. The antenna device includes an antenna unit, a shield unit coupled to an upper surface of the antenna unit, a heat radiation unit coupled to an upper surface of the shield unit, for discharging heat transferred from the portable terminal, and a cover coupled to an upper surface of the heat radiation unit, wherein the antenna device is mounted on case of the portable terminal.

In accordance with still another aspect of the present invention, a method for manufacturing a battery cover provided with an antenna device is provided. The method includes coupling an antenna unit to a surface of the battery cover, coupling a shield unit to an upper surface of the antenna device, coupling a heat radiation unit to an upper surface of the shield unit, and coupling a cover to an upper surface of the heat radiation unit.

In accordance with yet another aspect of the present invention, a method for manufacturing a battery cover provided with an antenna device is provided. The method includes coupling a shield unit to an upper surface of an antenna unit, coupling a heat radiation unit to an upper surface of the shield unit, coupling the antenna unit to a surface of the battery cover, and coupling a cover to an upper surface of the heat radiation unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 3 and 4 are perspective views respectively showing a portable terminal according to an exemplary embodiment of the present invention having an NFC antenna mounted thereon according to the present invention, in which FIG. 3 shows an upper surface of the portable terminal and FIG. 4 shows a bottom surface of the portable terminal;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
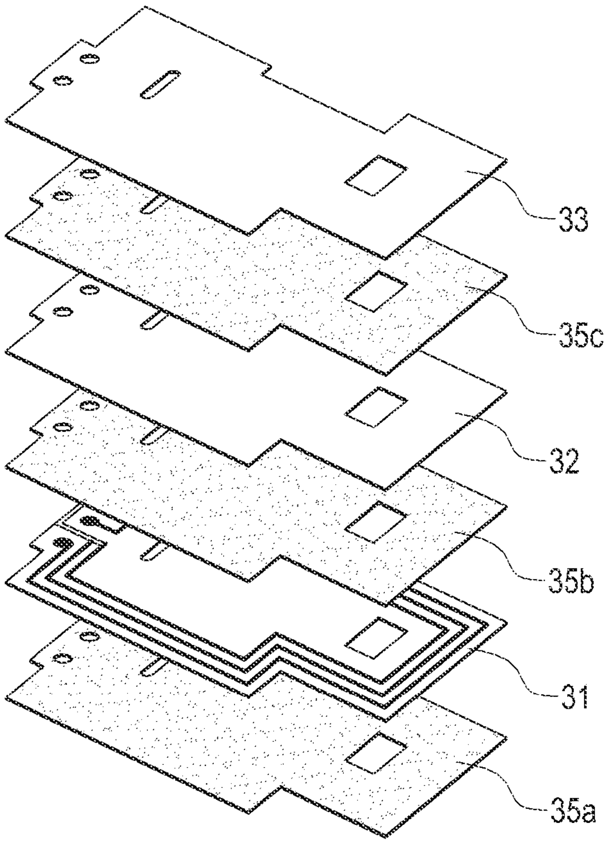
FIG.1 (RELATED ART)
FIG. 1 is an exploded perspective view showing a Near Field Communication (NFC) antenna device to be mounted on a portable terminal, according to the related art.
Figure 2:
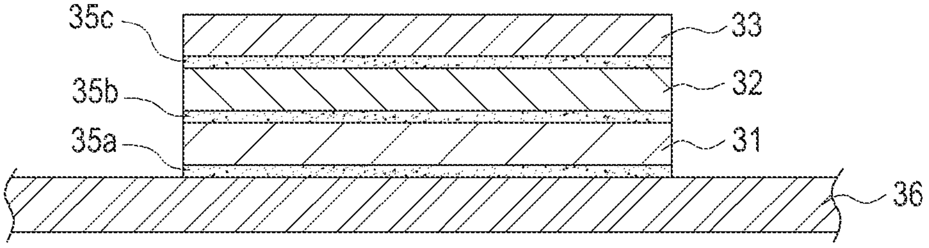
FIG.2 (RELATED ART)
FIG. 2 is a sectional view showing the NFC antenna device of FIG. 1 according to the related art.
Figure 3:
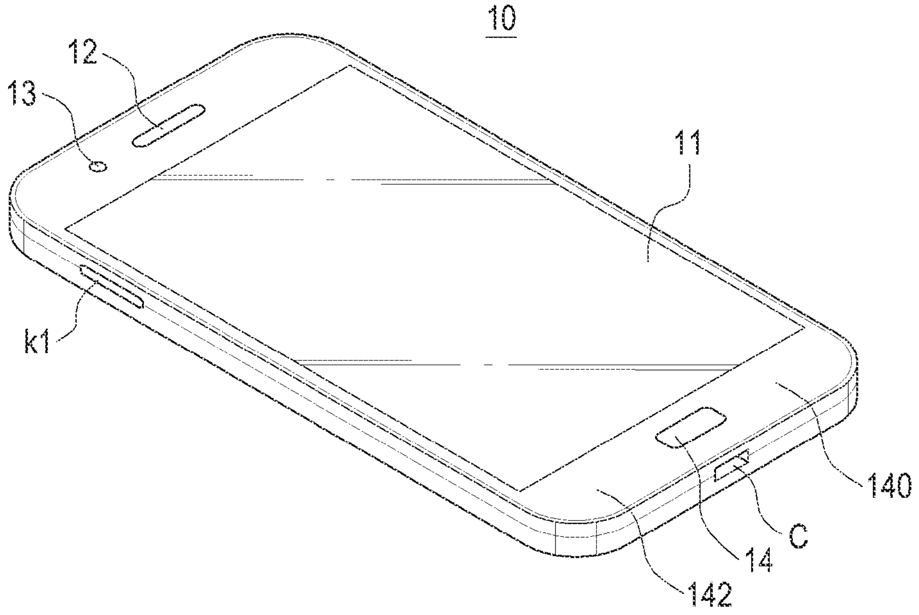
Figure 4:
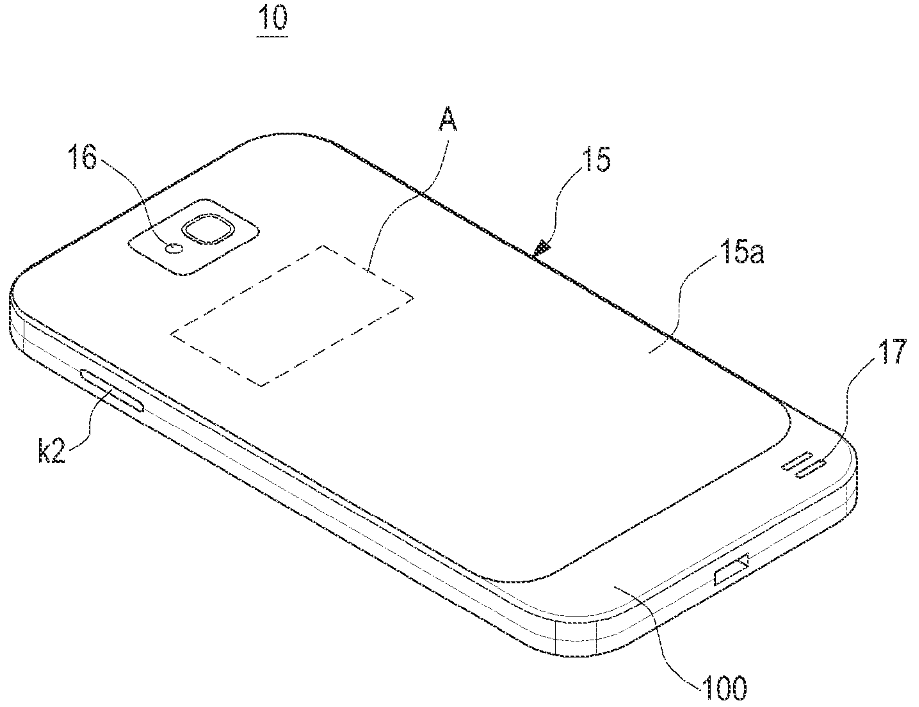

FIGS. 3 and 4 are perspective views respectively showing a portable terminal employing a Near Field Communication (NFC) antenna device having a heat radiation unit according to an exemplary embodiment of the present invention, in which FIG. 3 shows an upper surface of the portable terminal and FIG. 4 shows a bottom surface of the portable terminal.

The antenna device according to exemplary embodiments of the present invention will be described with reference to FIGS. 3 and 4. It is explained that the exemplary embodiments of the present invention are applied to "portable terminals". The term "portable terminals" is a general term and it will be understood that the present invention can be applied to any kind of portable terminal including a palm sized personal computer, a personal communication system, a personal digital assistant, a hand-held Personal Computer (PC), a smart phone, a wireless Local Area Network (LAN) terminal, a lap-top computer, a net-book, a tablet PC, and the like. Accordingly, the term "portable terminals" is not used to limit the present invention to a certain device.

For convenience of illustration, a smart phone will be illustrated as an example of a portable terminal as shown in FIGS. 3 and 4.

Referring to FIG. 3, the portable terminal 10 has a touch screen 11 entirely arranged on an upper surface thereof, a speaker 12 and a front camera 13 disposed at an upper portion on the upper surface thereof, and a home button 14 and touch keys 140 and 142 arranged at a lower portion on the upper surface thereof.

Referring to FIG. 4, the portable terminal 10 has a battery cover 15, a rear camera 16 and another speaker 17 arranged on a bottom surface thereof. The battery cover 15 has a structure in which it is detachably coupled to the bottom surface 100 of the portable terminal. The portable terminal 10 has an NFC antenna device with an exemplary heat radiation unit according to the present invention mounted thereon. In the illustrated embodiment, the heat radiation unit is mounted at a portion (indicated by a dotted line A) on an inner surface of the battery cover 15. In addition, the portable terminal has a volume control key k1, an on/off key k2, a connector c and the like, arranged on sides thereof. The reference numeral '15*a*' indicates an outer surface of the battery cover 15.

Hereinafter, a structure of an NFC antenna device having a heat radiation function according to the present invention will be described with reference to accompanying drawings.

Figure 5:
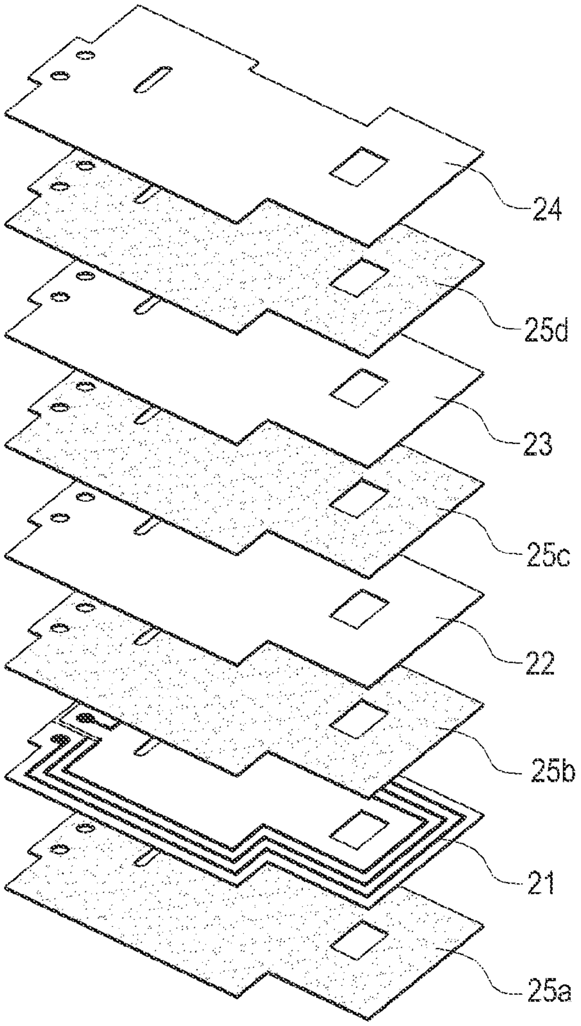
FIG. 5 is an exploded perspective view showing an NFC antenna according to an exemplary embodiment of the present invention, in which the NFC antenna is mounted on the portable terminal.
Figure 6:
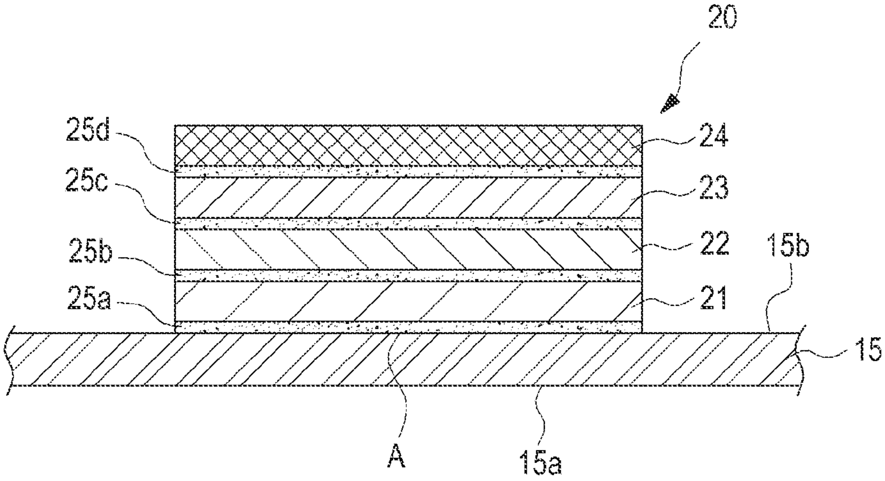
FIG. 6 is a sectional view showing a mounting state of an NFC antenna according to an exemplary embodiment of the present invention.

FIG. 5 is an exploded perspective view showing an NFC antenna according to an exemplary embodiment of the present invention, in which the NFC antenna is mounted on the portable terminal. FIG. 6 is a sectional view showing a mounting state of an NFC antenna according to an exemplary embodiment of the present invention.

Referring to FIGS. 5 and 6, an exemplary embodiment of the present invention is employed with an NFC antenna device 20. As illustrated, an exemplary embodiment of the present invention is employed with an NFC antenna device mounted on a case of a portable terminal, more particularly on an inner surface 15*b* of the battery cover 15 which is detachably coupled to a body of the portable terminal. The battery cover of the portable terminal has a structure of being detachably coupled to the portable terminal in order that a discharged battery mounted on the body of the portable terminal may be exchanged with a charged battery. The structure of the battery cover 15 has a combination of prominences and depressions that, although not shown, will be understood by those skilled in the art.

The antenna device 20 is an NFC antenna device and includes an antenna unit 21, a shield unit 22, a heat radiation unit 23, and a cover unit 24. The antenna device 20 is constructed in a manner of being vertically stacked and having the above mentioned units coupled in the order listed. Further, the antenna device 20 is coupled to a location of the case of the portable terminal. The case of the portable terminal is a battery cover 15 detachably assembled to a bottom surface of the portable terminal. The antenna device 20 is mounted at an area on the inner surface 15*b* of the battery cover, which is arranged to be opposite to the interior of the portable terminal The antenna unit 21 is an NFC antenna, which is a thin-type Flexible Printed Circuit Board (FPBC), such as a film, with a thickness of about 0.075 mm. The antenna unit 21 has an adhesive tape 25*a* provided on a bottom surface thereof, which is coupled to a location on the inner surface of the battery cover.

The shield unit 22 is coupled to the upper surface of the antenna unit 21 so as to shield the antenna unit 21 from an external environment, for example an environment capable of deteriorating the performance of the antenna. The shield unit 22 includes a shield sheet, which is coupled to the upper surface of the antenna unit 21 by means of the adhesive tape 25*b*. The shield sheet has a thickness of about 0.1 mm. The shield sheet is made of a ferrite material, which is coupled to the antenna unit 21.

The heat radiation unit 23 is a sheet that functions to disperse heat, and is coupled to an upper surface of the shield unit 23 by means of an adhesive tape 25*c*. The heat radiation unit 23 will be described in more detail below. The heat radiation unit 23 absorbs heat transmitted from the portable terminal and discharges the heat to the antenna unit 21 with a relatively low temperature.

The cover unit 24 is a film with a thickness of about 0.05 mm, which is an outermost protection part coupled to an upper surface of the heat radiation unit 23 by means of the adhesive tape 25*d*.

Hereinafter, structures of a heat radiation unit employed with an antenna device, and an improved heat radiation unit will be described with reference to accompanying drawings.

Figure 7:
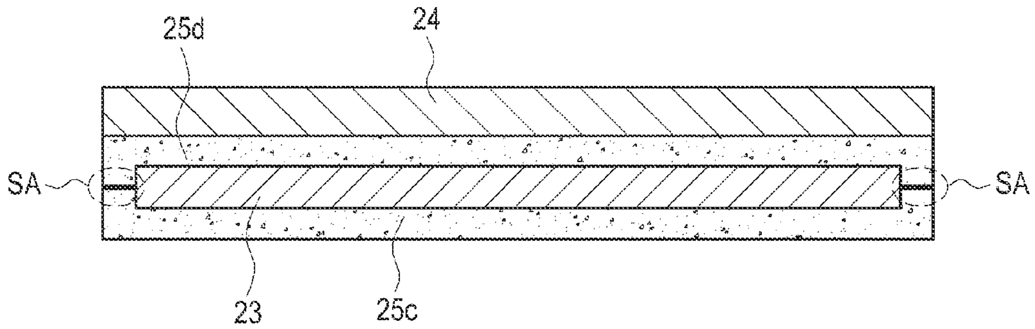
FIG. 7 is a sectional view showing a structure of a heat radiation sheet according to an exemplary embodiment of the present invention.
Figure 8:
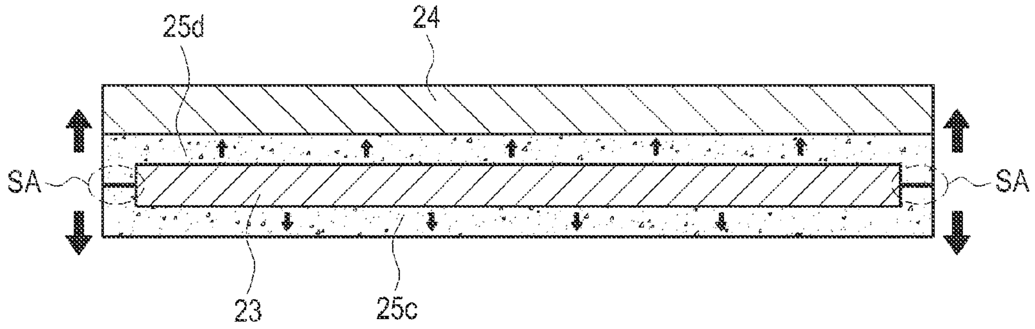
FIG. 8 is a sectional view showing the heat radiation sheet shown in FIG. 7 according to an exemplary embodiment of the present invention, which illustrates stress applied to the heat radiation sheet when the heat radiation sheet is bent.

FIG. 7 is a sectional view showing a structure of a heat radiation sheet according to an exemplary embodiment of the present invention. FIG. 8 is a sectional view showing the heat radiation sheet shown in FIG. 7 according to an exemplary embodiment of the present invention, which illustrates stress applied to the heat radiation sheet when the heat radiation sheet is bent.

Referring to FIG. 7, the heat radiation sheet 23 is made of a graphite material. A basic structure of the graphite material will be described below. The heat radiation sheet 23 is made in such a manner that the graphite material having a particle size smaller than 50 μm and a heat conductivity larger than 1000 W/m·K is baked and pressed at a temperature higher than 3000° C. Although the heat radiation sheet 23 made in this manner provides thermal conductivity, it causes degradation of the NFC antenna.

Further, the heat radiation sheet 23 is provided with adhesive tapes 25*c* and 25*d* on upper and bottom surfaces of the graphite material constructing the heat radiation sheet 23. At this time, an edge of the heat radiation sheet 23 is designed to have a size smaller by about (substantially) 1 mm than that of the adhesive tape so that the upper and lower adhesive tapes 25*c* and 25*d* come in close contact with each other during the pressing of the upper and lower adhesive tapes. Thereby, it is possible to prevent the graphite sheet from being separated.

Referring to FIG. 8, however, in the case that the heat radiation sheet 23 is employed with the NFC antenna provided with the battery cover of the portable terminal, a separation between layers is generated. More specifically, a notable and serious separation between the layers in a sealing area is generated.

If the heat radiation sheet 23 is employed with the battery cover of the portable terminal, separation between the heat radiation sheet 23 and the upper and lower adhesive tapes 25*c* and 25*d* is generated. When the battery cover is bent, the heat radiation sheet is bent. In turn, the adhesive strength of the upper and lower adhesive tapes 25*c* and 25*d* attached to the upper and bottom surfaces of the heat radiation sheet operates in opposite directions, so that it is difficult to prevent separation between the layers of the heat radiation sheet. When this continues, the heat radiation sheet may be torn so as to fail to carry out a heat radiation function properly. Accordingly, an improved structure for mounting a heat radiation sheet will be presented.

Figure 9:
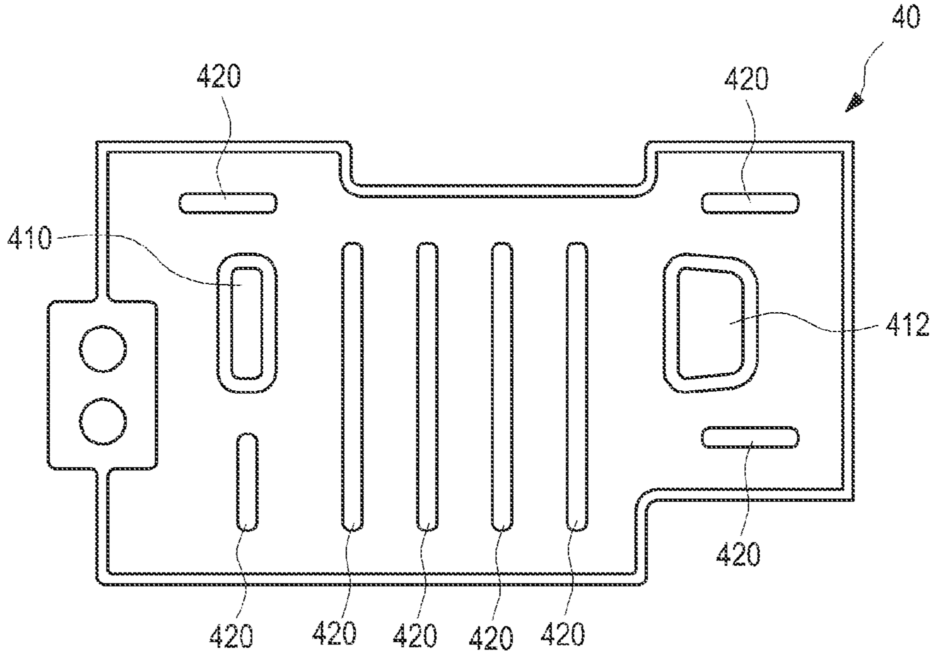
FIG. 9 is a plan view showing the heat radiation sheet employed with an NFC antenna device according to an exemplary embodiment of the present invention.
Figure 10:
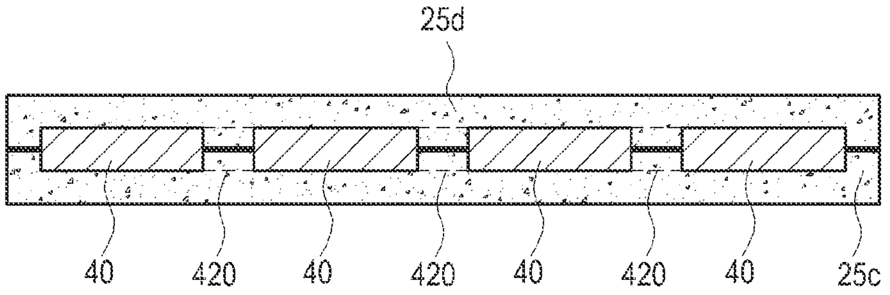
FIG. 10 is a sectional view showing the heat radiation sheet shown in FIG. 9, in which sealing apertures are sealed according to an exemplary embodiment of the present invention.

FIG. 9 is a plan view showing a heat radiation sheet employed with an NFC antenna device according to an exemplary embodiment of the present invention. FIG. 10 is a sectional view showing the heat radiation sheet shown in FIG. 9, in which sealing apertures are sealed according to an exemplary embodiment of the present invention.

Referring to FIGS. 9 and 10, a heat radiation sheet 40 includes one or more guide openings 410 and 412 and one or more sealing openings 420. The guide openings 410 and 412 are provided to accurately attach the heat radiation sheet 40, and are formed in pairs. The guide openings 410 and 412 may have various shapes.

The sealing opening 420 is formed to prevent separation between the heat radiation sheet 40 and the upper and lower adhesive tapes 25*c* and 25*d* (e.g., separation between layers caused by stress generated when the battery cover is bent). More particularly, the sealing opening is formed in order to prevent separation between the peripheries of the heat radiation sheet 40 and the upper and lower adhesive tapes 25*c* and 25*d*. A plurality of the sealing openings 420 may be formed and spaced at a distance apart from the guide openings 410 and 412. In an exemplary implementation, the plurality of sealing openings 420 may be formed at locations where separation between the layers may be generated due to the strong bending strength when the battery cover is bent. Since two guide openings 410 and 412 are respectively formed at sides rather than the center of the heat radiation sheet 40, the sealing openings 420 may be arranged between two guide openings 410 and 412. Moreover, the sealing openings 420 may be formed adjacent to the guide openings 410 and 412 in a side area. Furthermore, the sealing openings 420 may be formed in an area where the guide openings 410 and 412 are not formed.

The sealing openings 420 can be formed in various shapes. However, plural sealing openings 420 may be formed so as to be arranged in parallel and at equidistance from one another rather than to form a plurality of the sealing opening 420 in various shapes at irregular locations, in order to prevent separation between the layers. The respective sealing openings 420 are formed in various shapes. However, it is preferred to form the sealing openings 420 in a long and linear shape.

Referring to FIG. 10, when the upper and lower adhesive tapes 25*c* and 25*d* are attached to the heat radiation sheet 40, the sealing openings 420 are filled with a part of the upper and lower adhesive tapes 25*c* and 25*d*. When the sealing openings 420 are filled with a part of the upper and lower adhesive tapes 25*c* and 25*d*, it is possible to minimize stress generated between the heat radiation sheet 40 and the upper and lower adhesive tapes 25*c* and 25*d* even though the battery cover is bent, thereby preventing separation between the heat radiation sheet and the upper and lower adhesive tapes.

The temperature distribution of the battery cover when an NFC antenna having no heat radiation sheet is coupled to the inner surface of the battery cover of the portable terminal and when an NFC antenna having the heat radiation sheet is coupled to the inner surface of the battery cover of the portable terminal will be described with reference to FIGS. 11 and 12.

Figure 11:
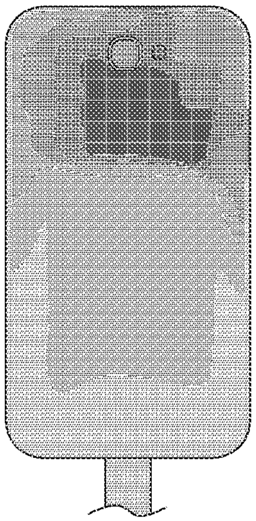
FIG. 11 is a view showing a temperature distribution of an NFC antenna having no heat radiation sheet, in which the NFC antenna is coupled to an inner surface of a battery cover of a portable terminal according to an exemplary embodiment of the present invention.

FIG. 11 is a view showing a temperature distribution of an NFC antenna having no heat radiation sheet, in which the NFC antenna is coupled to an inner surface of a battery cover of a portable terminal according to an exemplary embodiment of the present invention. FIG. 12 is a view showing a temperature distribution of an NFC antenna having a heat radiation sheet according to an exemplary embodiment of the present invention, in which the NFC antenna is coupled to a bottom surface of a battery cover of the portable terminal.

Figure 12:
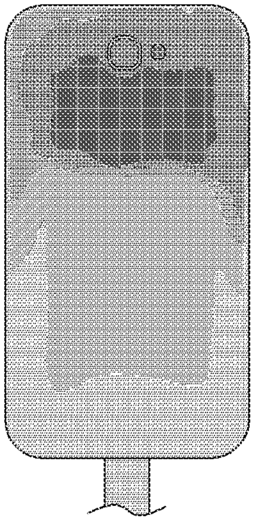
FIG. 12 is a view showing a temperature distribution of an NFC antenna having a heat radiation sheet according to an exemplary embodiment of the present invention, in which the NFC antenna is coupled to a bottom surface of a battery cover of the portable terminal.

Referring to FIGS. 11 and 12, the battery cover of the portable terminal having an NFC antenna device of the related art has a temperature of 41° C., and the battery cover of the portable terminal having the NFC antenna device equipped with the heat radiation sheet according to the present invention has a temperature of 39.8° C. That is, the present invention has an effect on the reduction of the temperature by about 1.2° C., in comparison with the NFC antenna of the related art. If the temperature of a human body is 36.7° C., especially, decreasing by 1.2° C. from the higher temperature than that of the human body is very effective.

In an exemplary embodiment of the present invention, on the other hand, it is described that the battery cover, the NFC antenna device 21, the shield unit 22, the heat radiation unit 23 and the cover 24 are stacked vertically in the order listed. However, it is to be understood that this is merely an example and that it is not limited that the heat radiation unit 23 is arranged between the shield unit 22 and the cover unit 24.

In other words, exemplary embodiments of the present invention may have a structure in that the battery cover, the NFC antenna device, the heat radiation unit, the shield unit and the cover are stacked vertically in the order listed, but it may have a structure in that the battery cover, the heat radiation unit, the NFC antenna device, the shield unit and the cover are stacked vertically in the order listed.

However, it is preferred to arrange the heat radiation unit according to the present invention at a location where the performance of the NFC antenna device is not adversely affected. In exemplary embodiments of the present invention, substantially, it is preferred to stack the battery cover, the NFC antenna device, the shield unit, the heat radiation unit and the cover in the order listed because this structure has a good effect on prevention of the performance of the NFC antenna device from being depleted.

Hereinafter, a method (referred to as manufacturing method) of manufacturing a case having the antenna device with the heat radiation function will be described with reference to FIGS. 13 and 14.

Figure 13:
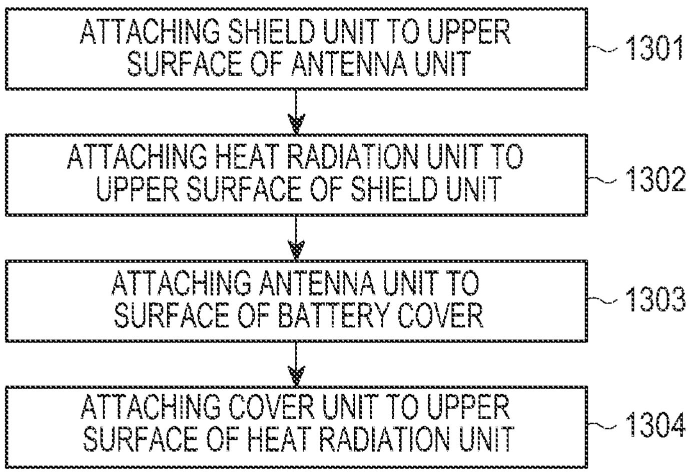
FIG. 13 is a flowchart illustrating a method for manufacturing a battery cover including an antenna device according to an exemplary embodiment of the present invention.

FIG. 13 is a flowchart illustrating a method of manufacturing a battery cover including an antenna device according to an exemplary embodiment of the present invention.

As will be described in the method of FIG. 13, the battery cover is detachably coupled to a bottom surface of the portable terminal, the inner surface of which the antenna device is mounted on.

In the method of manufacturing the case provided with the antenna device, the antenna device is prepared and coupled to a location on the inner surface of the battery case. More particularly, the shield unit is coupled to an upper surface of the antenna device in operation 1301. A prepared heat radiation unit is coupled to an upper surface of the shield unit in operation 1302. The antenna device is coupled to a surface of the battery cover in operation 1303, and the cover unit is coupled to an upper surface of the heat radiation unit in operation 1304. The manufacturing method further includes an operation of forming at least one sealing opening in the prepared heat radiation unit in order to prevent separation between layers. The sealing openings provided to the heat radiation unit are respectively filled with an adhesive agent after operation 1304 is finished, so that the adhesive agent can minimize the generation of stress when the heat radiation unit is bent. The structure of the antenna unit, the shield unit, the heat radiation unit and the cover unit will be omitted because they have been already described.

Figure 14:
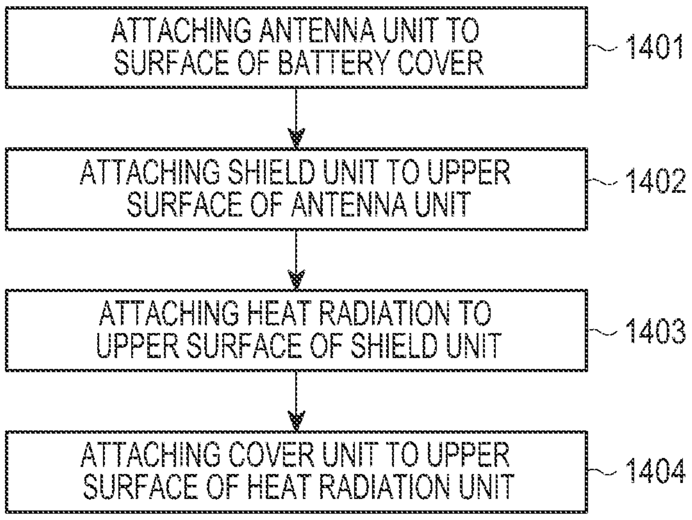
FIG. 14 is a flowchart illustrating a method for manufacturing a battery cover including an antenna device according to an exemplary embodiment of the present invention.

FIG. 14 is a flowchart illustrating a method for manufacturing a battery cover provided with an antenna device according to an exemplary embodiment of the present invention.

As will be described in the method of FIG. 14, the battery cover is detachably coupled to the bottom surface of the portable terminal, the inner surface of which the antenna device is mounted on. In the manufacturing method of the case provided with the antenna device, the antenna unit, the shield unit, the heat radiation unit and the cover unit are stacked vertically in the order listed. More particularly, the antenna unit is coupled to a surface of the battery cover in operation 1401. A shield unit is coupled to an upper surface of the antenna device in operation 1402. A prepared heat radiation unit is coupled to an upper surface of the shield unit in operation 1403, and a cover unit is coupled to an upper surface of the heat radiation unit in operation 1404. The sealing openings provided with the heat radiation unit are respectively filled with an adhesive agent after the fourth operation is finished, so that it is possible to minimize a generation of stress when the heat radiation unit is bent. The structure of the antenna unit, the shield unit, the heat radiation unit and the cover unit will be omitted because they have been already described.

According to the exemplary manufacturing method, as described already, an integrated type antenna with a heat radiation function is prepared and coupled to an inner surface of the battery cover. Further, an antenna unit, a shield unit, a heat radiation unit and a cover unit constructing the antenna device are coupled to the inner surface of the battery cover in the order listed.

As described above, exemplary embodiments of the present invention provide the heat radiation unit to the antenna device mounted on the battery cover of the portable terminal, thereby lowering a sensory temperature that a user feels and preventing a performance depletion of the antenna.

Further, exemplary embodiments of the present invention provide a heat radiation sheet with a plurality of sealing openings, so as to prevent separation between the layers of the heat radiation unit. Accordingly, exemplary embodiments of the present invention have an advantage in that the antenna device can be effectively mounted on a case such as a battery cover.

While the invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A portable terminal comprising:

a case provided for the portable terminal, wherein the case comprises a battery cover detachably assembled to a bottom surface of the portable terminal; and an antenna device mounted on an inner surface of the battery cover, wherein the antenna device comprises:

an antenna unit coupled to a location on the inner surface of the case;

a shield unit coupled to an upper surface of the antenna unit;

a heat radiation unit, coupled to an upper surface of the shield unit; and a protection cover coupled to an upper surface of the heat radiation unit, and wherein the heat radiation unit absorbs heat transmitted from an interior of the portable terminal so as to discharge the heat to the antenna unit.

2. The portable terminal as claimed in claim 1, wherein the antenna unit includes a near field communication antenna made of a thin type flexible printed circuit board.

3. The portable terminal as claimed in claim 2, wherein the shield unit includes a ferrite sheet.

4. The portable terminal as claimed in claim 2, wherein the heat radiation unit includes a heat radiation sheet and adhesive tapes provided to an upper surface and a lower surface of the heat radiation sheet.

5. The portable terminal as claimed in claim 4, wherein an edge of the heat radiation sheet has a size smaller by about 1 mm than that of the upper and lower adhesive tapes, which is sealed by means of the upper and lower adhesive tapes.

6. The portable terminal as claimed in claim 5, wherein the heat radiation sheet includes a graphite sheet.

7. The portable terminal as claimed in claim 3, wherein the heat radiation sheet has one or more openings.

8. The portable terminal as claimed in claim 7, wherein each of the one or more openings includes one or more guide openings for providing an attachment location, and one or more sealing openings for preventing a separation between layers in a bent state, which are formed at a distance apart from the guide openings.

9. The portable terminal as claimed in claim 8, wherein a part of the sealing openings is arranged in parallel between the guide openings.

10. The portable terminal as claimed in claim 8, wherein the respective sealing openings are filled with the adhesive tapes of the upper and lower surfaces of the heat radiation unit.

11. The portable terminal as claimed in claim 1, wherein the antenna unit, the shield unit, the heat radiation unit and the cover unit are stacked vertically in the order listed and coupled to one another, so as to be an integrated body.

12. An antenna device mounted on a portable terminal, the antenna device comprising:

an antenna unit;

a shield unit coupled to an upper surface of the antenna unit;

a heat radiation unit coupled to an upper surface of the shield unit; and a cover unit coupled to an upper surface of the heat radiation unit, wherein the antenna unit is coupled to an inner surface of a case of the portable terminal and the case comprises a battery cover detachably assembled to a bottom surface of the portable terminal, and wherein the heat radiation unit absorbs heat transmitted from an interior of the portable terminal so as to discharge the heat to the antenna unit.

13. The antenna device as claimed in claim 12, wherein the antenna unit includes a near field communication antenna made of a thin type flexible printed circuit board.

14. The antenna device as claimed in claim 13, wherein the shield unit includes a ferrite sheet.

15. The antenna device as claimed in claim 13, wherein the heat radiation unit includes a heat radiation sheet and adhesive tapes respectively provided to an upper surface and a lower surface of the heat radiation sheet.

16. The antenna device as claimed in claim 15, wherein an edge of the heat radiation sheet has a size smaller by about 1 mm than that of the upper and lower adhesive tapes, which is sealed by means of the upper and lower adhesive tapes.

17. The antenna device as claimed in claim 16, wherein the heat radiation sheet includes a graphite sheet.

18. The antenna device as claimed in claim 15, wherein the heat radiation sheet has one or more openings.

19. The antenna device as claimed in claim 18, wherein the one or more openings include one or more guide opening providing an attachment location, and one or more sealing openings preventing a separation between layers in a bent state, which are formed at a distance apart from the guide openings.

20. The antenna device as claimed in claim 19, wherein a part of the sealing openings is arranged in parallel between the guide openings.

21. The antenna device as claimed in claim 19, wherein the respective sealing openings are filled with the adhesive tapes of the upper and lower surfaces of the heat radiation unit.

22. The antenna device as claimed in claim 12, wherein the antenna unit, the shield unit, the heat radiation unit and the cover unit are stacked vertically in the order listed and coupled to one another, so as to be an integrated body.

23. A battery cover of a portable terminal comprising:

an antenna unit;

a shield unit coupled to an upper surface of the antenna unit;

a heat radiation unit coupled to an upper surface of the shield unit; and a cover unit coupled to an upper surface of the heat radiation unit, wherein the heat radiation unit absorbs the heat transmitted from the portable terminal so as to discharge the heat to the antenna unit with a relatively low temperature.

24. The battery cover as claimed in claim 23, wherein the battery cover is detachably assembled to a bottom surface of the portable terminal.

25. The battery cover as claimed in claim 24, wherein the antenna unit includes a near field communication antenna made of a thin type flexible printed circuit board.

26. The battery cover as claimed in claim 23, wherein the heat radiation unit comprises:

one or more guide openings for providing an attachment location, and one or more sealing openings for preventing a separation between layers in a bent state, which are formed at a distance apart from the guide openings.

27. A method for manufacturing a battery cover having an antenna device, the method comprising:

coupling an antenna unit to a surface of the battery cover;

coupling a shield unit to an upper surface of the antenna unit;

coupling a heat radiation unit to an upper surface of the shield unit;

forming one or more sealing openings in the heat radiation unit so as to prevent a separation between layers in a bending of the heat radiation unit; and coupling a cover unit to an upper surface of the heat radiation unit, wherein the sealing openings are respectively filled with adhesive after the coupling of the cover unit to the heat radiation unit, so as to minimize stress in the bending of the heat radiation unit.

28. A method for manufacturing a battery cover having an antenna device, the method comprising:

coupling a shield unit on an upper surface of an antenna unit;

coupling a heat radiation unit on an upper surface of an antenna unit;

forming one or more sealing opening in the heat radiation unit so as to prevent a separation between layers in a bending of the heat radiation unit;

coupling the antenna unit on a surface of the battery cover; and coupling a cover unit on an upper surface of the heat radiation unit, wherein the sealing openings are respectively filled with adhesive after the coupling of the cover to the heat radiation unit, so as to minimize stress in the bending of the heat radiation unit.

29. The method for manufacturing a battery cover having an antenna device as claimed in claim 28, wherein the heat radiation unit includes a heat radiation sheet which has a thickness less than 50 μm and a conductivity more than 1000 W/m·K, and which is made through processes of baking and pressing graphite material at a temperature higher than 3000° C.

* * * * *